United States Patent [19]

Hale et al.

[11] Patent Number: 5,234,198
[45] Date of Patent: Aug. 10, 1993

[54] APPARATUS FOR INSTALLING OPTICAL FIBER IN CONDUIT

[75] Inventors: Albert L. Hale, Berkeley Heights, N.J.; Manuel R. Santana, Roswell, Ga.; Kirk P. Wells, Glen Gardner, N.J.

[73] Assignee: AT&T Bell Laboratories, Murray Hill, N.J.

[21] Appl. No.: 720,988

[22] Filed: Jun. 25, 1991

[51] Int. Cl.⁵ .............................................. B65H 59/00
[52] U.S. Cl. ........................ 254/134.4; 254/134.3 FT
[58] Field of Search ................... 254/134.4, 134.3 R, 254/134.3 FT

[56] References Cited

U.S. PATENT DOCUMENTS

| | | | |
|---|---|---|---|
| 1,620,788 | 3/1927 | Thompson et al. | |
| 2,980,399 | 6/1958 | Littlefield | 254/134.4 |
| 3,346,045 | 5/1965 | Knapp et al. | 166/0.5 |
| 3,401,749 | 9/1968 | Daniel | 166/46 |
| 3,422,631 | 5/1965 | Silverman | 61/72.1 |
| 3,467,196 | 9/1969 | Kinsman | 166/315 |
| 3,589,135 | 6/1971 | Ede | 61/72.1 |
| 3,793,732 | 2/1974 | Hamrick | 33/137 |
| 4,030,702 | 6/1977 | Ware et al. | 254/134.4 |
| 4,498,659 | 2/1985 | Brockelsby, III | 254/134.4 |
| 4,640,576 | 2/1987 | Eastwood | 350/96.23 |
| 4,648,744 | 3/1987 | Knapp | 405/154 |
| 4,691,896 | 9/1987 | Reeve et al. | 254/134.4 |
| 4,856,760 | 8/1989 | Frost | 254/134.4 |
| 4,930,860 | 6/1990 | Tansey et al. | 350/96.23 |
| 4,948,097 | 8/1990 | Reeve | 254/134.4 |
| 5,022,634 | 6/1991 | Keeble | 254/134.4 |
| 5,090,665 | 2/1992 | Walters et al. | 254/134.4 |
| 5,121,644 | 6/1992 | Grey et al. | 254/134.4 |

Primary Examiner—Bruce M. Kisliuk
Assistant Examiner—Eileen Morgan
Attorney, Agent, or Firm—Edward W. Somers; Donald E. Hayes, Jr.

[57] ABSTRACT

Optical fiber (20) which may be disposed in the form of a ribbon (28,30), for example, is caused to become disposed in a conduit (42) such as a duct which may exist in the field by introducing the optical fiber and a pressurized liquid transporting medium (37) into the conduit. The liquid transporting medium is effective to cause the optical fiber to be moved along in the conduit to cause a leading end of the fiber to emerge from a far end of the conduit and be accessible for connective arrangements, for example.

8 Claims, 3 Drawing Sheets

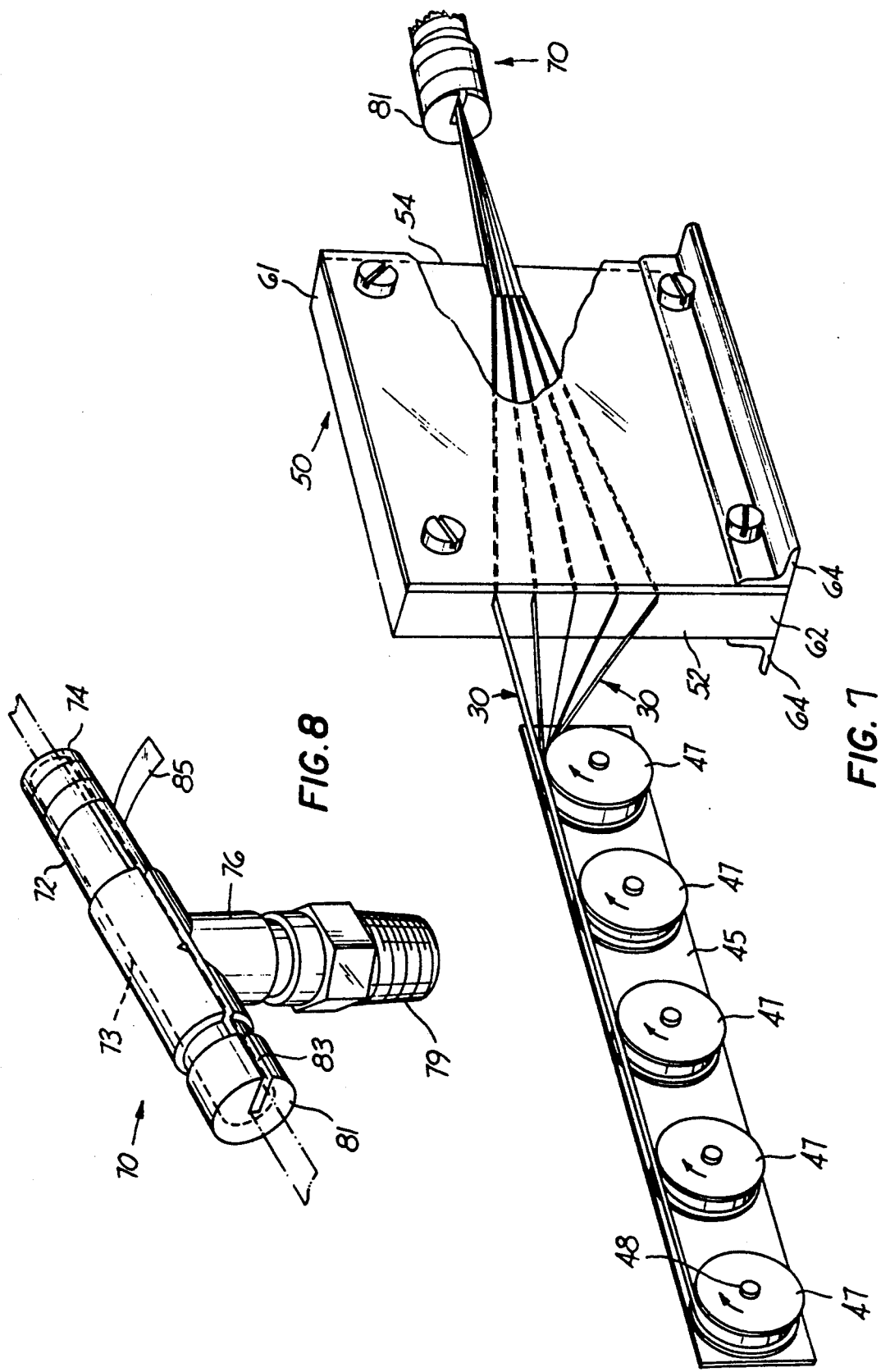

APPARATUS FOR INSTALLING OPTICAL FIBER IN CONDUIT

TECHNICAL FIELD

This invention relates to methods of and apparatus for installing optical fiber in a conduit. More particularly, the invention relates to methods of and apparatus for causing optical fiber which may be arranged in ribbon form to become disposed in a conduit such as in an existing duct.

BACKGROUND OF THE INVENTION

Optical fiber cables carrying optical fiber transmission lines have heretofore been installed by methods which are used to install metallic conductor cables. Such methods may involve the step of pulling the cable with a pulling rope through a previously installed cable conduit or duct.

Unlike the metallic conductors of an insulated metallic conductor cable, optical fibers are easily damaged by tensile stress. Such stress may, for example, propagate micro-cracks, leading to fiber breakage over a period of time. In order to avoid undue stresses in the fiber and consequent impairment of transmission, optical fiber cables may be reinforced, in some instances by providing a central strength member, comprising one or more steel wires, about which the optical fibers are disposed. Strength members instead may be disposed as elements of the sheath system. The strength members take up tensile stresses and thereby allow the cable to undergo the rigors accompanying installation of the cable.

Unfortunately, the strength members may provide insufficient protection against local stresses caused by pulling a cable through a duct having a tortuous configuration, for example. The problem of having to pull a cable into a duct to add transmission capacity may be overcome by installing at the outset sufficient optical fiber cables which have sufficiently large numbers of optical fibers to satisfy forseeable future traffic demands. The installation of optical fiber cables which initially include relatively large numbers of optical fibers may be in order, notwithstanding the need for only a small fraction of the installed fibers to provide traffic carrying capacity that is ample for initial requirements.

The initial installation of large diameter optical fiber cables which include relatively high numbers of optical fibers is undesirable for a variety of reasons. Firstly, there are problems of a technical nature inherent in such cables, such as, for example, the difficulty of forming connections and of achieving required high strength-to-weight ratios. Secondly, there are clear economic drawbacks in committing capital resources to install initially unused optical fiber capacity. This is particularly valid in view of recent advances in optical fiber technology which lead one to expect continued substantial reductions in the price and improvement in the quality of optical fiber. Thirdly, there is the serious risk of damaging in a single incident very large numbers of expensive optical fibers. Finally, the routing of optical fiber transmission lines becomes difficult as flexibility decreases with increasing diameter.

As an alternative to the initial installation of relatively large diameter optical fiber cables, improved methods of installation of optical fiber for additional capacity have been sought. Methods of installing optical fiber cables in ducts are known in the art. A method of installing optical fibers with pulling ropes is described by Herman S L Hu and Ronald T. Miyahara in an article entitled "Subducts: The Answer to Honolulu's Growing Pains" which appeared at pages 22–35 of the Apr. 7, 1980 issue of *Telephony*. The installation method described in the foregoing publication includes the step of rodding out a section of an existing 100 mm duct. Thereafter 25 mm polyethylene tubes are inserted into the duct by using pulling ropes. The polyethylene tubes form subducts into each of which an optical fiber cable may be pulled with the aid of a nylon pull cord which has previously been inserted into the subduct. The pull cord may be inserted by means of a parachute which is attached to a leading end of the cord and which is pushed through the subduct with compressed air or pulled therethrough by vacuum.

The just-described method deals with some of the problems discussed hereinbefore. It enables fiber capacity to be increased as demand increases and separates optical fiber cables being installed from those cables already in a duct, thereby reducing the likelihood of wedging, and hence overstressing, of optical fiber cable.

In another method, optical fiber cable is installed in a fluid transmission conduit by inserting a pig or the like into the conduit at one end thereof and connected to one end of an optical fiber cable or pilot wire which is inserted into the interior of the conduit through a fluid seal. The pig, which is connected to one end of the cable or pilot wire for towing purposes, is pumped through a predetermined portion of the conduit, preferably by a liquid such as water, to provide a relatively smooth traversal. The pig is retrieved at the receiving end of the predetermined conduit portion where the cable is disconnected from the pig and terminated by a suitable connector exterior to the conduit or connected to a further section of cable for extension through an additional portion or portions of conduit.

An extensive network of conduits which are capable of having fluid flow therethrough and which already are in existence in the United States and other countries include those which have been used for the transportation of crude oil, refined petroleum liquids and other hydrocarbon fluids. This is particularly advantageous with respect to the use of both active and inactive pipelines for receiving optical fiber cables and the like. Fluid transmission pipelines are particularly attractive for use in conjunction with stringing optical fiber cables because the pipeline normally extends along a direct route between major points of sending and receiving communication signals and provides mechanical protection for the cables themselves. Further, the extensive network of pipelines already in existence minimizes the effort required in acquiring right-of-way for installation of the cable.

In still another prior art method of installing optical fiber cable, a leading end of optical fiber is inserted along a tubular pathway comprising a previously installed conduit. The cable is propelled along the pathway by fluid drag of a gaseous medium which is flowed through the conduit in the desired direction of advance.

The installation of fiber by the use of flowing air is a somewhat new and advantageous method for installing optical fiber transmission lines. A bundle of optical fibers also may be propelled along a conduit by the fluid drag of compressed air which is fed into the duct. It will be appreciated that to generate sufficient fluid drag to propel the optical fiber transmission medium, the gaseous medium has to be flowed through the conduit at a velocity which is substantially greater than the desired rate of advance. Typically, the inner diameter of a conduit which is suitable for such an installation technique is 6 mm, the outer diameter of the fiber bundle is 2 mm, its mass is 2 to 3 g/m and the pressure is approximately $10^6$ Pa. Suitable material for both the conduit and the fiber packaging is polyethylene.

There are disadvantages with these techniques insofar as their use to move optical fiber cable into existing conduits in the field is concerned. The larger the conduit in which the optical fiber is to become disposed, the more difficult it is to propel the optical fiber by use of pressurized air. Other prior art schemes which include, for example, the use of a pig are not altogether satisfactory. First of all, the conduit into which the optical fiber is to be moved may not be sufficiently large to accommodate a pig. Further, a pig may be immobilized in a conduit having a tortuous configuration.

What is desired are methods which overcome these drawbacks. Also, the sought-after methods and apparatus must be capable of being used to move optical fiber ribbons into a conduit. An optical fiber ribbon includes an array of optical fibers held between two tapes or held together as is shown in U.S. Pat. No. 4,900,126 which issued on Feb. 13, 1990 in the name of K. W. Jackson, G. A. Lochkovic, P. D. Patel, M. L. Pearsall, and J. R. Petisce.

What is sought-after and what seemingly is not available are methods and apparatus for moving optical fiber into existing conduits without the need for pressurized air. Further, the methods and apparatus should be such that they may be used to move ribbons, for example, into conduits which are relatively large in internal diameter and to move the fiber or fiber ribbon cables along a tortuous path.

SUMMARY OF THE INVENTION

The foregoing problems of the prior art have been overcome by the methods and apparatus of this invention. In a method of causing optical fiber transmission media to become disposed in a conduit, a flow of liquid through a conduit in which an optical transmission medium is to become disposed is established. A leading end of an optical transmission medium which is to become disposed in the conduit is inserted into the conduit whereupon the flow of liquid causes successive portions of the optical transmission medium to be carried along in the conduit to a predetermined location to cause a length of the optical fiber transmission medium to become disposed in the conduit.

Advantageously, the methods and apparatus of this invention may be used to move one or more optical fiber ribbons into ducts which may have a relatively large internal diameter compared with those suitable for installation by compressed air.

BRIEF DESCRIPTION OF THE DRAWING

Other features of the present invention will be more readily understood from the following detailed description of specific embodiments thereof when read in conjunction with the accompanying drawings, in which:

FIG. 7 is a perspective view of a payoff stand and organizer which are used in order to feed optical fiber ribbons into an existing conduit; and FIG. 8 is a perspective view of an adapter which is adapted to receive optical fibers from the organizer of FIG. 7 and to direct them and water into a conduit into which the optical fiber is to be fed.

DETAILED DESCRIPTION

Figure 1:
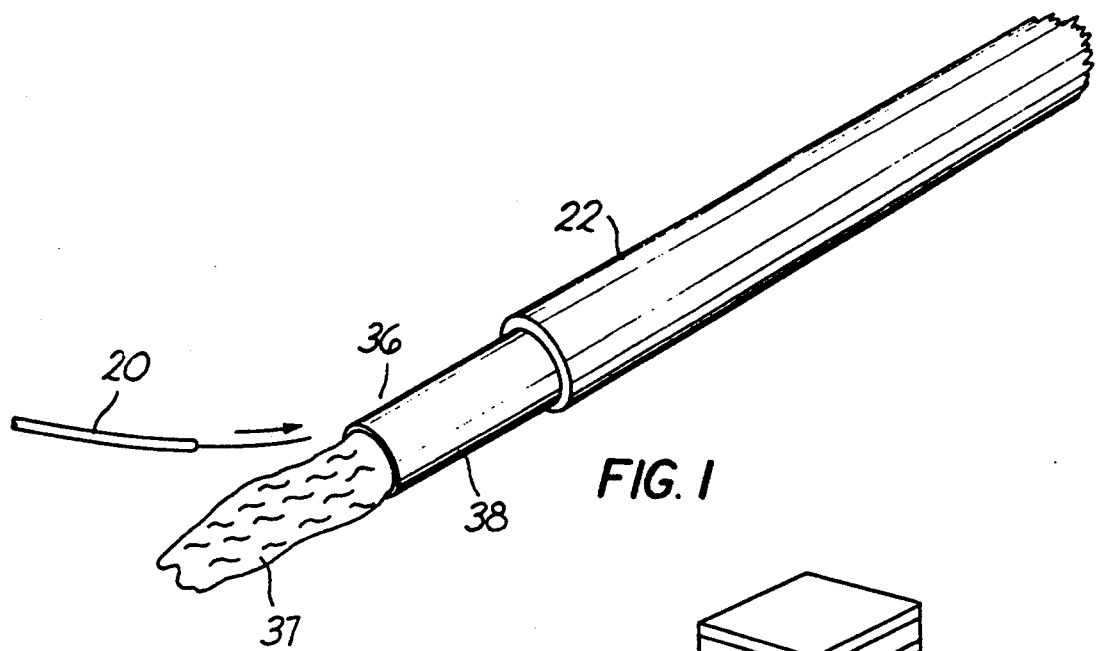
FIG. 1 is a perspective view of a conduit into which an optical fiber and a liquid medium are being introduced.
Figure 2:
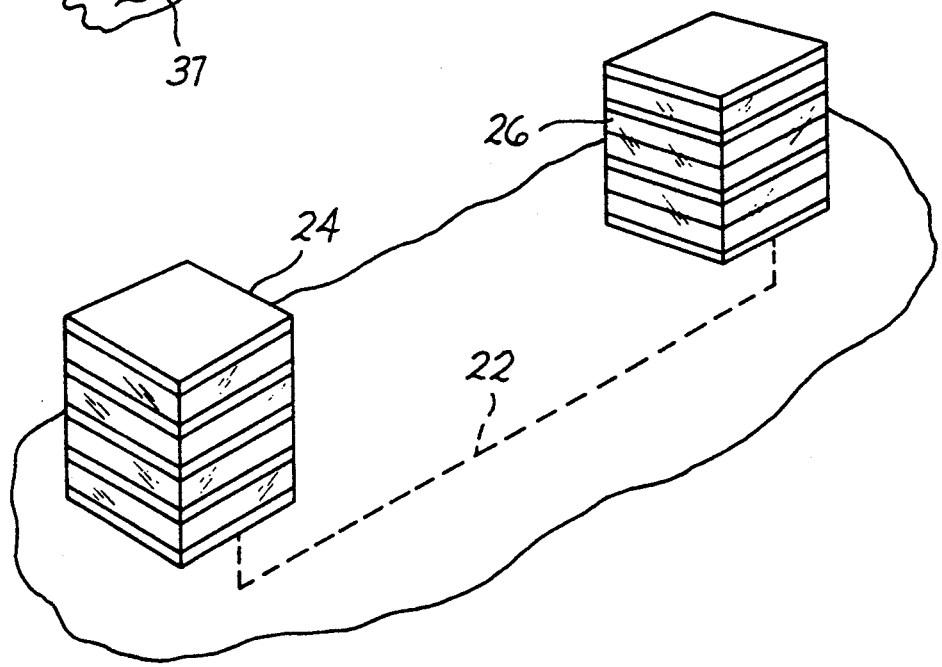
FIG. 2 is a perspective view showing a conduit which extends between two buildings and between which it is desired to route optical fiber cable.

Referring now to FIG. 1 there is shown an arrangement for causing optical fiber 20 to be moved through a conduit 22. The conduit 22 may comprise an existing duct which extends between buildings 24 and 26 (see FIG. 2) between which it is desired to provide an optical fiber communication link.

As is well known, optical fiber comprises a core and a cladding which together are drawn from a preform, covered by at least one layer of a coating material. The coating material is effective to protect the drawn optical fiber.

Figure 3:
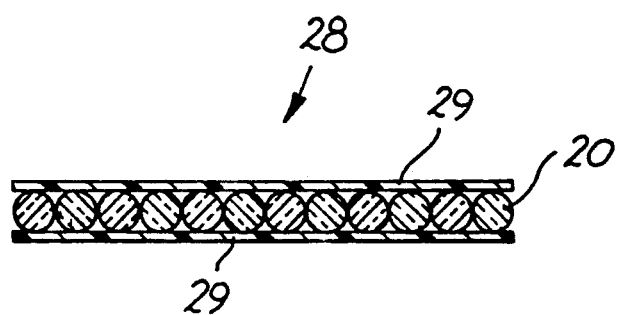
FIG. 3 is an end view of an optical fiber ribbon which comprises a planar array of optical fibers held between two tapes.
Figure 4:
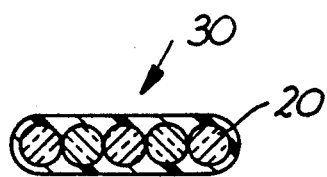
FIG. 4 is an end view of a bonded optical fiber ribbon.
Figure 5:
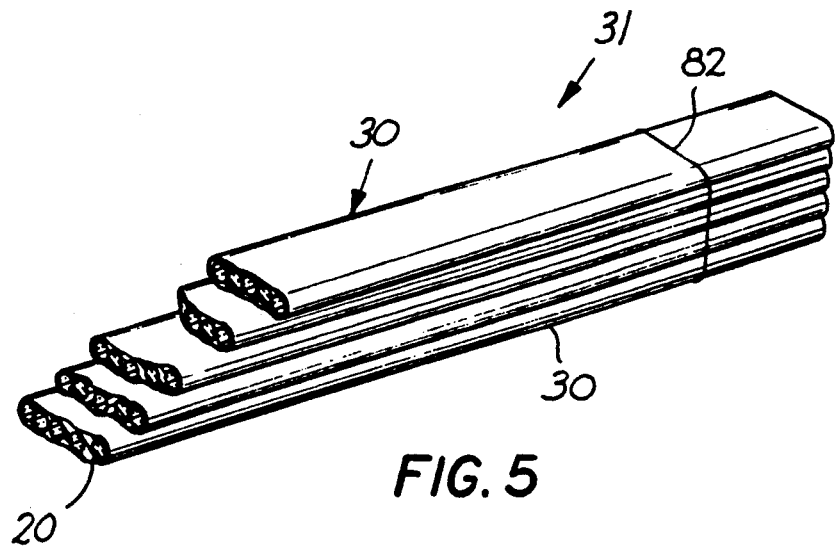
FIG. 5 is a perspective view partially in section which shows a stack of optical fiber ribbons which are bound together adjacent to a leading end of the stack.

For high density applications, optical fiber may be arranged in a ribbon 28 (see FIG. 3). Such a ribbon generally includes a plurality of optical fibers 20—20 which are disposed in a planar array between longitudinally extending tapes 29—29. In the alternative, optical fibers 20—20 may be disposed in a bonded ribbon structure 30 (see FIG. 4) such as that disclosed in priorly identified U.S. Pat. No. 4,900,126 which issued on Feb. 13, 1990. Typically, a stack 31 of ribbons 30—30 (see FIG. 5) or 28—28 are disposed in a cable (not shown).

In a method of use, leading ends of one or more ribbons or optical fibers are caused to become disposed adjacent to an entry end 36 of the conduit 22. The fiber is caused to be fed into the entrance to the conduit as a liquid transporting medium 37 is caused to be flowed into and along the conduit. An adapter 38 which is connected to the conduit 22 facilitates connection of the conduit to a supply of liquid.

The viscosity of the liquid transporting medium is important. The higher the viscosity, the higher the pressure which is needed to provide a desired velocity of fiber movement. What is desired is a liquid which has the lowest viscosity capable of providing sufficient drag on the fiber or ribbons to cause successive increments of length of the fiber or ribbons to be moved through the conduit.

It has been found that water is effective and is preferred as a liquid transporting medium to move the leading end of the fiber to the opposite end of the conduit. Such a method is effective to cause optical fiber to become disposed in an existing duct when it is not expedient to pull a cable between the two points between which communication service is desired.

Figure 6:
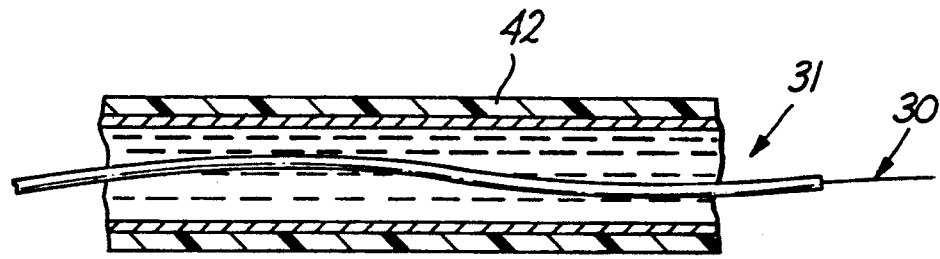
FIG. 6 is a side elevational view of a conduit into which optical fiber and a liquid transporting medium have been introduced.

In one embodiment, a conduit 42 (see FIG. 6) exists and extends between two points between which it is desired to run optical fiber. The conduit has an internal diameter of about 0.5 inch. It is desired to cause a stack 31 of the optical fiber ribbons 30—30 to become disposed in the conduit.

A payoff stand 45 (see FIG. 7) which includes a plurality of spools 47—47 having optical fiber ribbon 30 wound on each is caused to become disposed adjacent to an entrance end of the conduit 42. The payoff stand 45 includes a plurality of support spindles 48—48 each adapted to have a spool 47 rotatably mounted thereon.

A leading end portion of each ribbon of each spool 47 is caused to become disposed in a slot 49 of a ribbon organizer 50. The ribbon organizer 50 is disposed between the payoff stand 45 and an entrance to the conduit 42. As is seen in FIG. 7, the organizer 50 includes a plurality of slots 49—49 arranged therein so that the slots converge from an input end 52 to an output end 54 of the organizer. Each slot 49 has sufficient depth to accommodate an optical fiber ribbon 28 or 30. Further, the organizer 50 includes a main body portion 61 having a lower portion 62 which is supported between two footings 64—64. A transparent cover 66 is secured over the base in which are formed the slots 49—49.

From the output end of the organizer 50, the stack of ribbons 30—30 are caused to enter an adapter 70 (see FIGS. 7 and 8). The adapter 70, which provides a transition between the organizer and the conduit 42 into which the optical fiber ribbons are destined to move, is spaced in a preferred embodiment, about 8 inches from the output end of the organizer 50.

As is seen in FIG. 8, the adapter 70 includes a tubular portion 72 in which is formed a passageway 73. An end portion 74 of the tubular portion 72 is adapted to be connected to an entrance end portion of the conduit 42. The adapter 70 also includes a transverse tubular portion 76 which includes a bore therethrough. The bore in the tubular portion 76 communicates with the passageway 73 in the tubular portion 72. An end portion 79 of the transverse portion 76 is threaded externally to facilitate its connection to an ordinary garden hose, for example, which may be connected to a source of water, for example. In one embodiment, the end portion 74 of the tubular portion 72 has a diameter slightly greater than that of the end portion of the conduit 42 to allow it to become disposed about the end portion of the conduit. A tape (not shown) may be wrapped about the overlapped joint which is formed between the conduit 42 and the end portion of the adapter 70. The adapter 70 also includes a cap 81 at an entrance end thereof.

With the cover 66 of the organizer 50 in place and attached to the main body portion, a craftsperson causes an optical fiber ribbon 30 to become disposed in each slot 49 of the organizer 50 with a leading end portion extending slightly therebeyond. Once the ends of the ribbons 30—30 emerge from the output end of the organizer 50, they are bound together with a serving 82 of thread (see FIG. 5) which may be disposed in multiple wraps. The bound end of the stack of ribbons is then caused to become disposed in the tubular portion of the adapter 70 so that their leading end portions are disposed in the entrance end of the conduit 42. With the transverse portion 76 connected to a source, water is caused to flow into the transverse portion and then into the passageway 73 of the tubular portion. For a conduit 42 having an internal diameter of about 0.5 inch, the water flow is about 1 gallon per minute with a maximum pressure of about 10 psi gauge.

Initially, only a relatively small length of the stack of ribbons is exposed to the flow of the liquid and hence there is relatively little viscous drag on the stack. Accordingly, with only the initial portion of the stack in the conduit, the craftsperson applies forces to the stack to feed successive portions into the conduit. The spacing between the organizer 50 and the adapter 70 allows the craftsperson manually to apply such forces to the stack. Such forces need not be applied for very long inasmuch as the viscous drag forces applied by the liquid quickly become sufficient to move the successive portions of the stack of ribbons 30—30 through the conduit.

Also, it may be necessary to apply forces to the spools 47—47 to allow payoff of the ribbons 30—30 therefrom. The viscous drag forces applied by the flowing water engaging the stack may not be sufficient to overcome the spool friction and turn the spools to pay off the ribbons. Of course, this depends on parameters such as fluid pressure and friction of each spool on the associated spindle, for example. The payoff stand may be provided with payoff assist means (not shown) such as motorized drives for turning the spools at a rotational velocity which is carefully coordinated with the flow of the liquid. As the water is moved through the adapter 70 and into the conduit 42, successive increments of length of the stack 31 of ribbons 30—30 are caused to be moved through the adapter and along the conduit until a leading end thereof emerges from an opposite end of the conduit. In one example, a stack of five ribbons was moved through a conduit having a length of 2000 feet and being disposed in a tortuous path having 720° or the equivalent of two full circles of bends.

There almost certainly will be installations such as in intermediate manholes in a run where it becomes necessary to cause the adapter 70 to become disposed about a stack 31 of ribbons which is already extending from a duct on one side of the manhole to a duct on the other side. For those instances, the adapter includes a slit 83 (see FIG. 7) along one side of the adapter to allow the optical fiber to be disposed in and moved out of the passageway 73 therethrough. After the stack has been inserted through the adapter in the intermediate manhole, a tape 85 may be applied in wraps over the slit 83 to prevent the stack from moving inadvertently transversely through the slit as it is moved longitudinally along in the ducts and to retain the liquid. After the stack has been fed into the other duct and emerges from an opposite end of the other duct for connectorization, for example, the adapter 70 may be removed.

The methods and apparatus of this invention are readily adaptable to field conditions. Installation by methods of this invention are facilitated by the almost universal availability of liquid such as water.

It is to be understood that the above-described arrangements are simply illustrative of the invention. Other arrangements may be devised by those skilled in the art which will embody the principles of the invention and fall within the spirit and scope thereof.

We claim:

1. Apparatus for causing an optical fiber transmission medium to become disposed in a conduit which extends between two locations between which it is desired to route the optical fiber transmission medium, said apparatus comprising:

payoff means for holding an optical fiber transmission medium;

adapter means disposed between said payoff means and the conduit, said adapter means adapted to guide said optical fiber transmission medium from said payoff means into said conduit wherein said adapter means includes a tubular portion having a longitudinally extending passageway and a longitudinally extending slit which is formed through a wall of said tubular portion, which communicates with said passageway and which allows relative motion between said optical fiber transmission medium and said adapter means in a direction transverse of the direction of advance of the optical fiber transmission medium; and a source of liquid adapted to be connected to said adapter for providing between the optical fiber transmission medium and the conduit a suitable flow of liquid at a suitable pressure to cause optical fiber to be moved along in the conduit.

2. The apparatus of claim 1, wherein said apparatus also includes an organizer for directing a plurality of optical fiber ribbons from said payoff means to said adapter means.

3. The apparatus of claim 2, wherein said organizer includes a plurality of optical fiber ribbon receiving slots which converge from an input end of said organizer to an output end thereof.

4. The apparatus of claim 1, wherein said adapter means includes a tubular portion through which the optical fiber transmission medium is adapted to move and a portion which is transverse with said tubular portion and which is adapted to be connected to said source of liquid.

5. The apparatus of claim 1, wherein said payoff means includes a plurality of spools, each of which is mounted rotatably.

6. The apparatus of claim 5, wherein each of said spools include motorized means for causing each of said spools to be turned rotatably about an axis of rotation to pay off an optical fiber transmission medium thereon.

7. The apparatus of claim 1, wherein said adapter means includes means for covering said slit after a portion of said optical fiber transmission medium is disposed within said adapter and which is removable from said adapter to facilitate the removal of said adapter from said optical fiber transmission medium.

8. The apparatus of claim 1, wherein said apparatus also includes an organizer which is interposed between said payoff means and said adapter means for directing optical fiber transmission media from said payoff means to said adapter means and wherein an entry end of said adapter means is spaced from an output end of said organizer.

* * * * *